(12) United States Patent
Hong et al.

(10) Patent No.: US 6,614,556 B1
(45) Date of Patent: Sep. 2, 2003

(54) APPARATUS FOR QUANTIZING A DIGITAL IMAGE BY USING AN ERROR DIFFUSION COEFFICIENT AND THRESHOLD MODULATION IN ZIGZAG QUANTIZATION

(75) Inventors: Doo-Eui Hong, Kyoungki-do (KR); Choon-Woo Kim, Seoul (KR); Gyung-Nam Boo, Seoul (KR)

(73) Assignee: Sindoricoh Co., Ltd., Seoul (KR)

( * ) Notice: Subject to any disclaimer, the term of this patent is extended or adjusted under 35 U.S.C. 154(b) by 0 days.

(21) Appl. No.: 09/444,823

(22) Filed: Nov. 22, 1999

(51) Int. Cl.$^7$ .......................... H04N 1/405; H04N 1/409
(52) U.S. Cl. .................. 358/3.03; 358/3.04; 358/3.05; 358/3.22; 358/3.26
(58) Field of Search ........................ 358/3.03, 3.04, 358/3.05, 3.26, 1.9, 3.22, 466; 382/252

(56) References Cited

U.S. PATENT DOCUMENTS

| | | | | |
|---|---|---|---|---|
| 5,086,484 A | * | 2/1992 | Katayama et al. | 382/252 |
| 5,268,774 A | * | 12/1993 | Eschbach | 358/466 |
| 5,313,287 A | | 5/1994 | Barton | 382/252 |
| 5,535,019 A | * | 7/1996 | Eschbach | 358/3.03 |
| 5,604,605 A | | 2/1997 | Moolenaar | 358/3.03 |
| 5,668,638 A | | 9/1997 | Knox | 358/3.03 |
| 5,692,109 A | * | 11/1997 | Shu | 358/1.9 |
| 5,917,614 A | * | 6/1999 | Levien | 358/3.03 |
| 6,160,921 A | * | 12/2000 | Marcu | 382/252 |
| 6,369,912 B1 | * | 4/2002 | Kumashiro | 358/1.9 |
| 6,510,252 B1 | * | 1/2003 | Kishimoto | 382/252 |
| 6,552,822 B1 | * | 4/2003 | Kishimoto | 358/3.03 |
| 6,552,823 B1 | * | 4/2003 | Chang | 358/3.03 |

* cited by examiner

Primary Examiner—Scott Rogers
(74) Attorney, Agent, or Firm—Oblon, Spivak, McClelland, Maier & Neustadt, P.C.

(57) ABSTRACT

A threshold modulation method, includes the steps of: a) determining whether an input pixel value is greater than a threshold of a current input pixel from the original digital image; b) determining whether an output image value is a predetermined high level or low level based on the threshold; c) if the input pixel value is greater than the threshold and the output image value is the predetermined high level, modulating the threshold of the adjacent pixel; d) if the input pixel value is greater than the threshold and the output image value is the predetermined low level, modulating the threshold of the adjacent pixel; e) if the input pixel value is not greater than the threshold and the output image value is the predetermined low level, modulating the threshold of the adjacent pixel; and f) if the input pixel value is not greater than the threshold and the output image value is the predetermined high level, modulating the threshold of the adjacent pixel.

6 Claims, 6 Drawing Sheets

| 2/16 | 3/16 |
|------|------|
| 3/16 | 3/16 |
| 4/16 | *    |

| 2/16 | 3/16 |
|------|------|
| 3/16 | 3/16 |
| *    | 4/16 |

APPARATUS FOR QUANTIZING A DIGITAL IMAGE BY USING AN ERROR DIFFUSION COEFFICIENT AND THRESHOLD MODULATION IN ZIGZAG QUANTIZATION

FIELD OF THE INVENTION

The present invention relates to a digital image quantization apparatus; and more particularly, to an apparatus for quantizing a digital image of black and white mode by using an error diffusion coefficient and threshold modulation in zigzag quantization.

DESCRIPTION OF THE PRIOR ART

Typically, an analog image is converted to a digital image through sampling and quantization. That is, the digital image has gray scale value quantized based on the reflectivity of light within the sampling region. For example, when the gray scale value is quantized to one of 256 steps between white and black in case of a black and white mode digital image, the digital image can represent 254 scales of gray as well as black and white. Such a digital image is displayed on a monitor or outputted by an image output device such as a laser print, an inkjet printer and a digital copying machine, after digital image processing depending on its object.

On the other hand, most image output device prints a number of a certain size of pixels in a lattice on a white paper sheet. That is, the image output device can represent one of the white color of the paper sheet and ink or toner color.

When the input image to be printed is a continuous gray scale image, the input image is converted to a quantized image before printing and the converted quantized image is printed by the output device. The technique for converting the continuous gray scale to the quantized image is referred to 'image halftoning'. For a black and white mode output device, the printed black pixels within a given region are not recognized as separated pixels but as an averaged gray color when it is viewed from the distance. It is an illusion due to a limit of resolution of eyes of human being. Accordingly, the picture quality of the printed image depends on the image halftoning used in the quantization.

Oh the other hand, during a number of image halftoning techniques, there are two most popular methods, a dithering method and an error diffusion method. The dithering method quantizes the gray scale of the pixel by using a predetermined threshold sequence. The error diffusion method diffuses a quantization error of a current pixel into its adjacent pixels such that the quantization error is accounted for the quantization of the adjacent pixels. The dithering method is often used for its fast speed. The error diffusion method is used for its high quality of the quantized output image.

The error diffusion method was discussed at first in "An adaptive algorithm for spatial gray scale", Floyd and Steinberg, Society For Information Display(SID) international symposium proceeding, 1975. The method of Floyd and Steinberg is expressed as follows:

$$e(m,n) = u(m,n) - b(m,n) \quad (1)$$

where e(m,n) is the error value of the quantized output image, u(m,n) is the updated pixel value of the current input pixel, which is updated by using the diffused error from the previous pixel, and b(m,n) is the (m,n)-th pixel of the quantized output image, which has one of '0' and '255'.

And, in the equation (1), if u(m,n)>t(m,n), then b(m,n)=255 (where t(m,n) is a predetermined threshold '127' regardless of (m,n)) and, if otherwise, then b(m,n)=0.

$$u(m,n) = i(m,n) + \sum_{k,l \in R} w(k,l) e(m-k, n-l) \quad (2)$$

where i(m,n) is the (m,n)-th pixel of the given input continuous gray scale image and has its value between 0 to 255, R is a set of the adjacent pixels to which the quantization error is to be diffused, and w(k,l) is the weight of the quantization error to be diffused into the (k,l)-th pixels in R, k and l being positive integers.

However, the error diffusion method as described above results in artifacts with specific dot alignment which will be recognized by eyesight of human being. There are two representative artifacts, fingerprint and worm artifacts. The fingerprint artifact is a fingerprint-like regular pattern that appears mostly in mid-level gray scale, and can be eliminated substantially with higher resolution of the output device. In contrast, the worm artifact is a pattern that appears in the bright region and dark region due to recognizable orientation of the dots and is leaved unsolved, that is, recognizable, even when the higher resolution of the output device.

SUMMARY OF THE INVENTION

It is, therefore, a primary object of the invention to provide an apparatus for modulating a threshold to be used in quantization of an updated input pixel by using an error diffusion coefficient in digital image quantization with zigzag quantization order to distribute dots evenly in bright region and dark region of an image.

In accordance with one aspect of the present invention, there is provided an apparatus for quantizing an original digital image having a certain number of gray scales to a second image having a fewer number of gray scales than that of the original digital image, comprising: updating means for updating an input pixel value using update of a current input pixel from the original digital image by using information for the input pixel; quantizing means for quantizing the updated pixel value from the updating means by using a predetermined threshold to output the output image of the quantized pixel value; quantization error detecting means for detecting an error value of the output image of the quantized pixel value received from the quantizing means by using the updated input pixel value from the updating means; threshold modulating means for modulating the threshold of the quantizing means based on the input pixel value and the output image of the quantized pixel value from the quantizing means; and diffussing means for diffusing the quantization error value of the quantized pixel value of the current input pixel received from the quantization error detecting means into adjacent pixels of the current input pixel to apply the update information for the adjacent input pixel of the current input pixel to the updating means based the quantization error of the current pixel and a predetermined error diffusion coefficient, wherein the predetermined error diffusion coefficient is determined by a matrix:

$$\begin{bmatrix} w(2,1) & w(2,0) \\ w(1,1) & w(1,0) \\ w(0,1) & \end{bmatrix} = \begin{bmatrix} 2/16 & 3/16 \\ 3/16 & 4/16 \\ 4/16 & * \end{bmatrix}$$

where ω(2,1), ω(2,0), ω(1,1), ω(0,1) and ω(0,1) are weights of the error diffusion.

In accordance with one aspect of the present invention, there is provided a threshold modulation method for quantizing an original digital image having a certain number of gray scales to a second image having a fewer number of gray scales than that of the original digital image, comprising the steps of: a) determining whether an input pixel value is greater than a threshold of a current input pixel from the original digital image; b) determining whether an output image value is a predetermined high level or low level based on the threshold; c) if the input pixel value is greater than the threshold and the output image value is the predetermined high level, modulating the threshold of the adjacent pixel as:

$$t(m+p, n+q) -= Tf_1(p,q) \times t(m,n),$$

wherein t(m,n) is the threshold of the (m,n)-th pixel being the current input pixel, t(m+p, n+q) is the threshold of the pixel separated from the (m,n)-th pixel by (p,q), and $Tf_1(p,q)$ is a first threshold modulation coefficient; d) if the input pixel value is greater than the threshold and the output image value is the predetermined low level, modulating the threshold of the adjacent pixel as:

$$t(m+p, n+q) += Tf_2,$$

wherein t(m,n) is the threshold of the (m,n)-th pixel being current input pixel, t(m+p, n+q) is the threshold of the pixel separated from the (m,n)-th pixel by (p,q), and $Tf_2$ is a second threshold modulation coefficient; e) if the input pixel value is not greater than the threshold and the output image value is the predetermined low level, modulating the threshold of the adjacent pixel as:

$$t(m+p, n+q) -= Tf_1(p,q) \times t(m,n),$$

wherein t(m,n) is the threshold of the (m,n)-th pixel being the current input pixel, t(m+p, n+q) is the threshold of the pixel separated from the (m,n)th pixel by (p,q), and $Tf_1(p,q)$ is a first threshold modulation coefficient; and f) if the input pixel value is not greater than the threshold and the output image value is the predetermined high level, modulating the threshold of the adjacent pixel as:

$$t(m+p, n+q) -= Tf_2,$$

wherein t(m,n) is the threshold of the (m,n)th pixel being the currently input pixel, t(m+p, n+q) is the threshold of the pixel separated from the (m,n)th pixel by (p,q), and $Tf_2$ is a second threshold modulation coefficient.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, it will be described in detail for a preferred embodiment of the invention with reference to the accompanying drawings.

Figure 1:
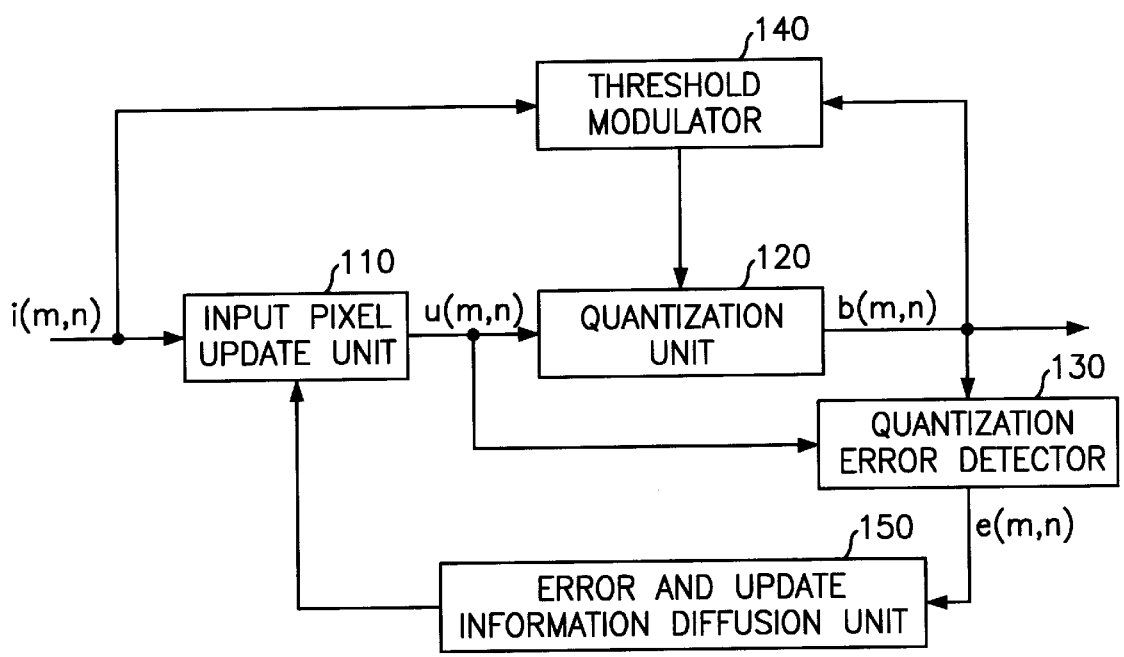
FIG. 1 represents a block diagram of one embodiment of an apparatus for quantizing a digital image by using an error diffusion coefficient in zigzag quantization in accordance with the present invention.

Referring to FIG. 1, there is a block diagram of a digital image quantizing apparatus using an error diffusion coefficient in zigzag quantization.

As shown in FIG. 1, the apparatus of the invention comprises an input pixel update unit 110, a quantization unit 120, a quantization error detector 130, a threshold modulator 140, and an error and update information diffusion unit 150.

The input pixel update unit 110 updates an input pixel using update information for the input pixel applied thereto. The input pixel update unit 110 includes an adder to add the update information for the input pixel from the error and update information diffusion unit 150 to the input pixel.

The quantization unit 120 outputs a quantized output image after quantizing the current pixel updated by the input pixel update unit 110.

The quantization error detector 130 detects an error value for the quantized output image from the quantization unit 120. The quantization error detector 130 includes a subtracter to subtract the current output image from the quantization unit 120 from the pixel updated by the input pixel update unit 110.

Further, assuming that the gray scale value of the m,n-th pixel is the input pixel value {i(m,n)}, it will be described in detail for the operation of the digital image quantizing apparatus of the present invention in the zigzag quantization.

Figures 2, 3A, 3B:
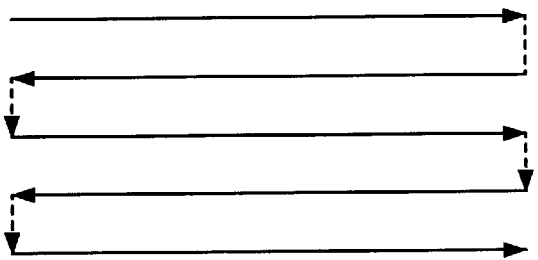
FIG. 2 shows quantization order of the zigzag employed by the algorithm used in the present invention.
FIGS. 3A and 3B illustrate the error diffusion coefficients used in the present invention.

The error and update information diffusion unit 150 receives the error calculated at the pixel separated by k,l from the current pixel m,n, that is, (m−k, n−l), calculates the update information to be used to update the input pixel value {i(m,n)} by using the received error and the predetermined error diffusion coefficient(as shown in FIGS. 3A and 3B), and outputs the update information to the input pixel update unit 110. At this point, the error and update information diffusion unit 150 stores the error value of the current pixel, detected by the quantization error detector 130, that is, the error value of the (m,n)-th pixel {e(m,n)}, into an error buffer(not shown).

When the update information is transferred thereto, the input pixel update unit 110 updates the input pixel {i(m,n)} by adding the transferred update information to the original image gray scale value so that the local gray scale average value of the quantized image is made be equal to that of the original image. The updated pixel value {u(m,n)} is applied to the quantization unit 120 and quantization error detector 130. The equation (2) as described above represents the procedure for updating the input pixel {i(m,n)}.

Subsequently, the quantization unit 120 compares the updated pixel value {u(m,n)} from the input pixel update unit 110 to a predetermined reference threshold {t(m,n)}(for example, the initial value of the threshold {t(m,n)} for the (m,n)-th pixel is 127.5 in the present invention), quantizes the updated pixel value {u(m, n)} depending on the comparison result, and outputs the output image {b(m,n)} of the quantized current pixel. That is, if the output pixel value {u(m,n)} from the input pixel update unit 110 is greater than the threshold {t(m,n)}, then the output image {b(m,n)} of the quantization unit 120 is '255', and if otherwise, the output image {b(m,n)}of the quantization unit 120 is '0'.

When receiving the output image {b(m,n)} of the quantized current pixel, the quantization error detector 120 subtracts the output image {b(m,n)} from the output value {u(m,n)} of the input pixel update unit 110 to detect the quantization error {e(m,n)} of the output image, which is transferred to the error and update information diffusion unit 150. Thus, the detected quantization error value {e(m,n)} of the output image is diffused to adjacent pixels around the current pixel and then used in their quantization. The equation (1) as described above represents the procedure for detecting the quantization error value {e(m,n)}of the output image {b(m,n)}.

At this point, the threshold modulator 140 compares the input pixel value {i(m,n)} to the output image {b(m,n)} of the current pixel to modulate the threshold of the quantization unit 120 depending of the comparison result. That is, the thresholds to be used in quantization of the adjacent pixels are adapted, thereby no recognizable orientation is generated by two adjacent pixels, i.e., no identical quantization result for the two adjacent pixels is prevented, in a bright region or a dark region of the image.

The operation for the threshold modulator unit 140 will be well understood by a threshold modulating method for the digital image quantization as described below.

First, as accounting for the distribution of the pixel within the bright region(i.e., i(m,n)>127), when a certain current pixel is determined as a black pixel, the adjacent pixels of the block pixel can be avoided to be determined as the black pixel by reducing the threshold of the unprocessed pixel around the current black pixel(dot). At this point, the reducing amount of the threshold depends on the input gray scale value of the corresponding pixel. If the current pixel is quantized as a white pixel, the adjacent pixel is made to the black pixel by increasing the threshold as diffusing constant times (<1) of the current threshold into the unprocessed adjacent pixel. At this point, the increasing amount of the threshold also depends on the input gray scale of the corresponding pixel. And also, the same procedure as described above is applied to the dark region(i.e., i(m,n)=<127)

Such a procedure can be expressed by an equation as follows. Here, every threshold t(m,n) has the initial value of 127.5.

The equation (3) is for the bright region.

$$t(m+p, n+q) \mathrel{+}= Tf_1(p, q) \times t(m, n) \quad \text{if } b(m, n) = 255 \quad (3)$$

$$t(m+p, n+q) \mathrel{+}= Tf_2 \quad \text{if } b(m, n) = 0$$

wherein t(m+p, n+q) is the threshold of the pixel separated from the (m,n)-th pixel by (p,q), each of $Tf_1(p,q)$ and $Tf_2$ is a threshold modulation coefficient determining the threshold increment.

And when the current pixel is determined as the black pixel as the equation (3), the threshold of the adjacent pixel is reduced by $Tf_2$, and $Tf_1(p,q)$ determines the time for which the reduced threshold is restored to the original threshold. Thus, $Tf_1(p,q)$ and $Tf_1$ are defined as following equations.

In the other words, if i(m,n)=0, then $Tf_2$=0, and, if i(m,n) is not 0, $Tf_1(p,q)$ and $Tf_2$ are defined as following equations (4) and (5).

$$Tf_1(p, q) = \rho(p, q) \times \left(\left[\frac{|i(m, n) - 127 \cdot 5|}{127 \cdot 5}\right]\right)^s \quad (4)$$

$$Tf_2 = -\sigma \times \left[\frac{|i(m, n) - 127 \cdot 5|}{127 \cdot 5}\right]^t \quad (5)$$

wherein $\rho(p,q)$ is determined by (p,q) and $\rho$, $\sigma$, s, t are predetermined constants.

And, in the threshold modulating method of the invention, resultant image quality depends on the threshold modulation coefficients $Tf_1$ and $Tf_2$. That is, if $Tf_1$ is too large, then the local average value is not equal to that the original image, which results in slow response characteristic in gray scale changing region. If $Tf_1$ is too small, there is no improvement in the pixel distribution.

Next, for the dark region(i.e., i(m,n)<=127), the t(m+p, n+q) is defined by following equation (6).

$$t(m+p, n+q) \mathrel{-}= Tf_1(p, q) \times (255 - t(m, n)) \quad \text{if } b(m, n) = 0 \quad (6)$$

$$t(m+p, n+q) \mathrel{-}= Tf_2 \quad \text{else}$$

The equation (6) represents the procedure of restoring the increased threshold with the $Tf_2$ when b(m,n)=0. On the other hand, the threshold around the white pixel is increased in order to prevent the adjacent white pixel from being quantized to white when b(m,n) is not 0.

In the present invention, in order to evenly distribute the dot in the bright region and the dark region and to diffuse the quantization error and the threshold symmetrically, a zigzag processing direction is used for quantization as shown in FIG. 2. In the conventional zigzag quantization using the Floyd and Steinberg's error diffusion coefficient, undesired patterns in the vertical direction as shown in FIG. 4B is appeared at ¼ and ¾ gray scales in following equation (7).

Figure 4A:
FIG. 4A shows a continuous gray scale image quantized by using the error diffusion coefficient of Floyd and Steinberg.
Figure 4B:
FIG. 4B offers a continuous gray scale image quantized by the error diffusion coefficient of Floyd and Steinberg in the zigzag quantization.

Thus, to eliminate the undesired patterns in the vertical direction as shown in FIG. 4B, a new error diffusion coefficient as shown in FIGS. 3A and 3B is used in the invention. Here, FIGS. 3A and 3B represent the error diffusion coefficient for even lines and those for odd lines, respectively.

In particular, the error diffusion coefficient discussed in the present invention can be expressed by the following equation (7).

$$\begin{bmatrix} w(2,1) & w(2,0) \\ w(1,1) & w(1,0) \\ w(0,1) & \end{bmatrix} = \begin{bmatrix} 2/16 & 3/16 \\ 3/16 & 4/16 \\ 4/16 & * \end{bmatrix} \quad (7)$$

Here, ω is the weight of the error to be diffused to the adjacent pixels.

Figure 4C:
FIG. 4C depicts a continuous gray scale image quantized by the error diffusion coefficient in FIGS. 3A and 3B in the zigzag quantization.

FIG. 4C shows the image of the current pixel, which is quantized by using the error diffusion coefficient as shown in FIGS. 3A and 3B.

And, an experiment was performed for several images to evaluate the performance of the inventive error diffusion coefficient and the threshold modulation method, and particularly the experiment for the threshold modulation was performed for the next first pixel and the lower first pixel with respect to the current pixel. That is, one of t(m,n+1) or t(m,n−1), and t(m+1,n) is affected depending on the current quantization direction. In the equations (3) and (6), ρ(p,q)= 3.2 is used when (p,q)=(0,1) or (p,q)=(0,−1) while ρ(p,q)= 2.4 is used when (p,q)=(1,0).

FIG. 4A illustrates the continuous gray scale image quantized by using the Floyd and Steinberg error diffusion coefficient.

FIG. 4B shows the continuous gray scale image quantized with the zigzag direction by using the Floyd and Steinberg's error diffusion coefficient.

FIG. 4C depicts one embodiment representing the continuous gray scale image quantized with the zigzag direction by using the error coefficient as shown in FIGS. 3A and 3B.

Figure 4D:
FIG. 4D represents a continuous gray scale image quantized by Fan's method.
Figure 4E:
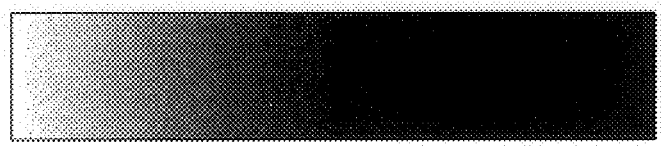
FIG. 4E illustrates a continuous gray scale image quantized by Eschbach's method.
Figure 4F:
FIG. 4F shows a continuous gray scale image quantized by using the error diffusion coefficient and the threshold modulation in accordance with the present invention.

FIG. 4F offers the continuous gray scale image quantized by using the error diffusion coefficient and the threshold modulation method discussed in the present invention, which results in the more even distribution within the bright region and the dark regions and the faster response when compared with the images of FIGS. 4A to 4C.

FIGS. 4D and 4E represent continuous gray scale images quantized by using the method of Fan and Eschbach, respectively. In order to examine the distribution of the pixels in the bright region and dark region, the image having four gray scales, 246, 248, 250 and 252 gray scales, and a background value 135 is used for a new test. The results of that test are shown in FIGS. 5A and 5B.

FIG. 4F represents a continuous gray scale images quantized by using the method of the error diffusion coefficient and the threshold modulation according to the present invention. In order to examine the distribution of the pixels in the bright region and dark region, the image having four gray scales, 246, 248, 250 and 252 gray scales, and a background value 135 is used for a new test. The results of that test are shown in FIG. 5C.

Figure 5A:
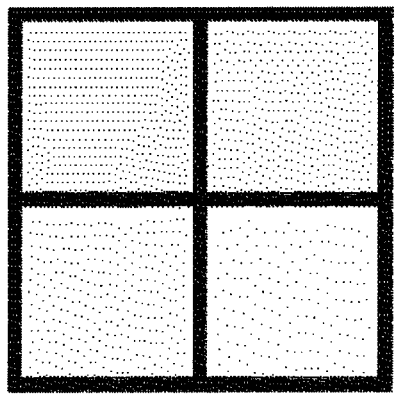
FIG. 5A provides an image quantized by Fan's method.
Figure 5B:
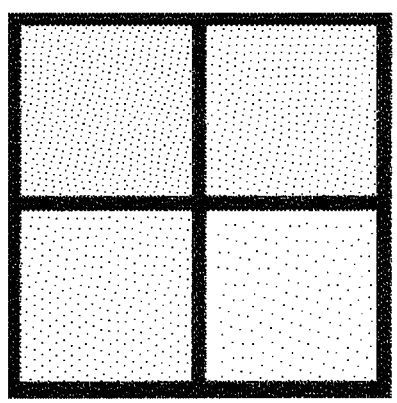
FIG. 5B provides an image quantized by Eschbach's method.
Figure 5C:
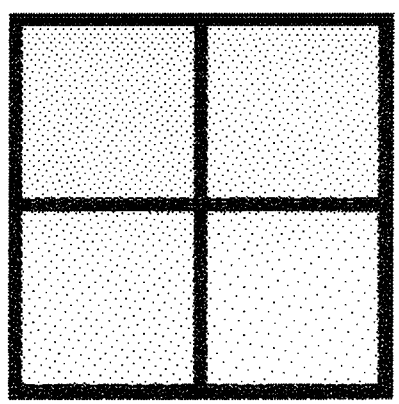
FIG. 5C offers an exemplary image quantized by the error diffusion coefficient and the threshold modulation in accordance with the present invention.

Thus, compared with the FIGS. 5A and 5B, FIG. 5C depicts that the inventive method results in the equal or more even distribution of the dots and dot orientation of 45 degrees, which will not be recognized.

Figure 6A:
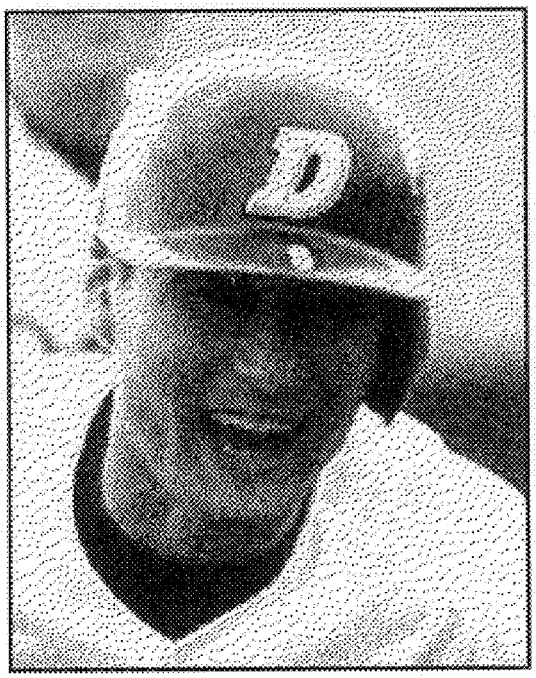
FIG. 6A depicts an exemplary diagram of an image quantized by applying the error diffusion coefficient of Floyd and Steinberg to an ordinary image.

FIG. 6A is an exemplary diagram of an image quantized by applying the error diffusion coefficient of Fan and Steinberg to an ordinary image, which has undesired warm patterns to which eyesight of human being is sensitive.

Figure 6B:
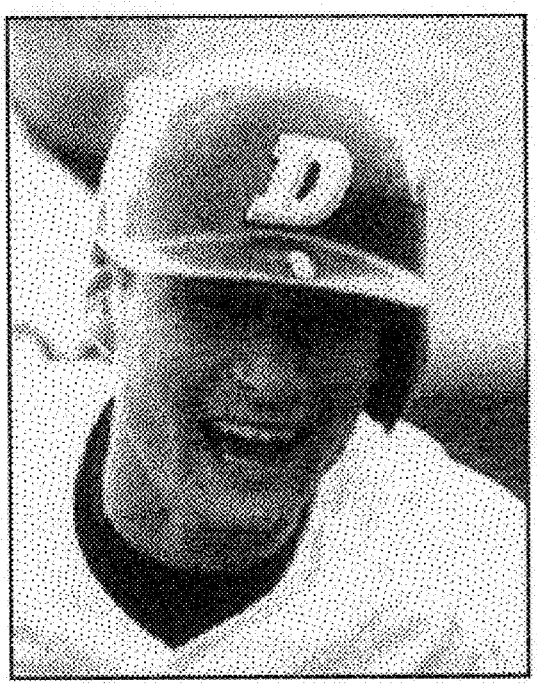
FIG. 6B shows an exemplary diagram of an image quantized by applying the error diffusion coefficient of Eschbach to the ordinary image.

FIG. 6B is an exemplary diagram of an image quantized by applying the method proposed by Eschbach to the ordinary image. In FIG. 6B, the undesired warm patterns are eliminated but there are some undesired patterns of horizontally and vertically distributed dots, to which eyesight of the human being is sensitive.

Figure 6C:
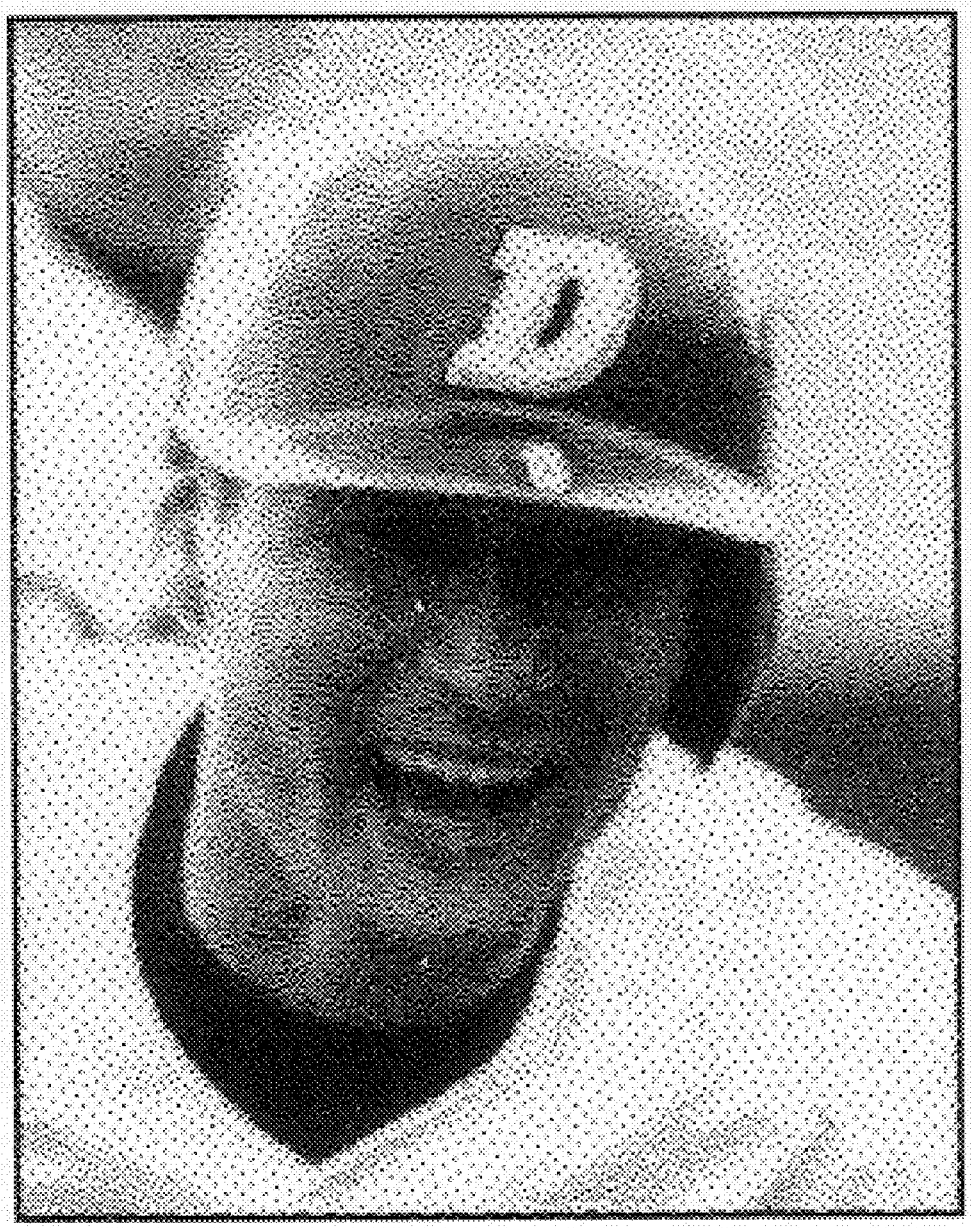
FIG. 6C illustrates an exemplary diagram of an image quantized by applying the error diffusion coefficient and the threshold modulation to the ordinary image in accordance with the present invention.

FIG. 6C is an exemplary diagram of an image quantized by the error diffusion coefficient and threshold modulation according to the present invention. In FIG. 6C, the undesired worm patterns are eliminated and the dots are distributed in 45 degrees, to which eyesight of the human being is less sensitive.

As compared above, the present invention improves the output image by eliminating the undesired worm patterns as shown in FIG. 6A and distributing the dots in 45 degree orientation to which eyesight is less sensitive than horizontal and vertical orientations.

Consequently, according to the present invention, the dot is uniformly distributed within the bright region and the dark region and the undesired worm pattern is eliminated, thereby the quality of the output image is significantly improved.

While the present invention has been described with respect to certain preferred embodiments only, other modifications and variations may be made without departing from the spirit and scope of the present invention as set forth in the following claims.

What is claimed is:

1. An apparatus for quantizing an original digital image having a certain number of gray scales to a second image having a fewer number of gray scales than that of the original digital image, comprising:

updating means for updating an input pixel value using update of a current input pixel from the original digital image by using information for the input pixel;

quantizing means for quantizing the updated pixel value from the updating means by using a predetermined threshold to output the output image of the quantized pixel value;

quantization error detecting means for detecting an error value of the output image of the quantized pixel value received from the quantizing means by using the updated input pixel value from the updating means;

threshold modulating means for modulating the threshold of the quantizing means based on the input pixel value and the output image of the quantized pixel value from the quantizing means; and diffussing means for diffusing the quantization error value of the quantized pixel value of the current input pixel received from the quantization error detecting means into adjacent pixels of the current input pixel to apply the update information for the adjacent input pixel of the current input pixel to the updating means based the quantization error of the current pixel and a predetermined error diffusion coefficient, wherein the predetermined error diffusion coefficient is determined by a matrix:

$$\begin{bmatrix} w(2,1) & w(2,0) \\ w(1,1) & w(1,0) \\ w(0,1) & \end{bmatrix} = \begin{bmatrix} 2/16 & 3/16 \\ 3/16 & 4/16 \\ 4/16 & * \end{bmatrix}$$

where ω(2,1), ω(2,0), ω(1,1), ω(0,1) and ω(0,1) are weights of the error diffusion.

2. The apparatus of claim 1, wherein the updating means includes adding means for adding the input pixel value to the update information for the input pixel from the diffusing means.

3. The apparatus of claim 1, wherein the quantization error detecting means includes subtracting means for subtracting the output image of the quantized pixel value received from the quantizing means from the updated pixel value received from the input pixel updating means.

4. A threshold modulation method for quantizing an original digital image having a certain number of gray scales to a second image having a fewer number of gray scales than that of the original digital image, comprising the steps of:

a) determining whether an input pixel value is greater than a threshold of a current input pixel from the original digital image;

b) determining whether an output image value is a predetermined high level or low level based on the threshold;

c) if the input pixel value is greater than the threshold and the output image value is the predetermined high level, modulating the threshold of the adjacent pixel as:

$$t(m+p, n+q) += Tf_1(p,q) \times t(m,n),$$

wherein $t(m,n)$ is the threshold of the $(m,n)$-th pixel being the current input pixel, $t(m+p, n+q)$ is the threshold of the pixel separated from the $(m,n)$-th pixel by $(p,q)$, and $Tf_1(p,q)$ is a first threshold modulation coefficient;

d) if the input pixel value is greater than the threshold and the output image value is the predetermined low level, modulating the threshold of the adjacent pixel as:

$$t(m+p, n+q) += Tf_2,$$

wherein $t(m,n)$ is the threshold of the $(m,n)$-th pixel being current input pixel, $t(m+p, n+q)$ is the threshold of the pixel separated from the $(m,n)$-th pixel by $(p,q)$, and $Tf_2$ is a second threshold modulation coefficient;

e) if the input pixel value is not greater than the threshold and the output image value is the predetermined low level, modulating the threshold of the adjacent pixel as:

$$t(m+p, n+q) -= Tf_1(p,q) \times t(m,n),$$

wherein $t(m,n)$ is the threshold of the $(m,n)$-th pixel being the current input pixel, $t(m+p, n+q)$ is the threshold of the pixel separated from the $(m,n)$th pixel by $(p,q)$, and $Tf_1(p,q)$ is a first threshold modulation coefficient; and f) if the input pixel value is not greater than the threshold and the output image value is the predetermined high level, modulating the threshold of the adjacent pixel as:

$$t(m+p, n+q) -= Tf_2,$$

wherein $t(m,n)$ is the threshold of the $(m,n)$th pixel being the currently input pixel, $t(m+p, n+q)$ is the threshold of the pixel separated from the $(m,n)$th pixel by $(p,q)$, and $Tf_2$ is a second threshold modulation coefficient.

5. The method of claim 4, wherein the predetermined high level is 255 and the predetermined low level is 0.

6. The method of claim 5, wherein the threshold is 127.5.

* * * * *